United States Patent
Ito

(10) Patent No.: US 8,295,007 B2
(45) Date of Patent: Oct. 23, 2012

(54) THIN FILM MAGNETIC TAPE HEAD INCLUDING GAP BETWEEN SUBSTRATE AND CLOSURE

(75) Inventor: Yuji Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 274 days.

(21) Appl. No.: 12/761,905

(22) Filed: Apr. 16, 2010

(65) Prior Publication Data

US 2011/0255192 A1    Oct. 20, 2011

(51) Int. Cl.
  *G11B 5/10*   (2006.01)
  *G11B 5/187*  (2006.01)
  *G11B 5/29*   (2006.01)
(52) U.S. Cl. .............. 360/122; 360/121; 360/125.72
(58) Field of Classification Search ............. 360/121, 360/122, 125.3, 125.71, 129, 125.54, 125.63, 360/125.72, 125.73
See application file for complete search history.

(56) References Cited

U.S. PATENT DOCUMENTS

| | | | |
|---|---|---|---|
| 6,885,518 B1 | 4/2005 | Chaug | |
| 7,609,488 B2 * | 10/2009 | Bonin et al. | 360/317 |
| 2004/0136119 A1 * | 7/2004 | Kirschenbaum et al. | 360/317 |
| 2005/0264912 A1 * | 12/2005 | Nikitin et al. | 360/75 |
| 2008/0314736 A1 * | 12/2008 | Biskeborn et al. | 204/192.1 |
| 2009/0174967 A1 * | 7/2009 | Biskeborn et al. | 360/313 |

* cited by examiner

*Primary Examiner* — Jefferson Evans
(74) *Attorney, Agent, or Firm* — Posz Law Group, PLC

(57) ABSTRACT

A magnetic tape head includes a writing element having a coil for generating magnetic flux and a yoke part that emits magnetic flux induced by the coil from a tape bearing surface opposite a magnetic tape, a substrate where the writing element is formed, and a closure joined with the substrate. A gap formed at a portion between the substrate and the closure exists from the yoke part in a direction orthogonal to a junction surface between the substrate and the closure.

13 Claims, 5 Drawing Sheets

THIN FILM MAGNETIC TAPE HEAD INCLUDING GAP BETWEEN SUBSTRATE AND CLOSURE

TECHNICAL FIELD

The present invention relates to a thin film magnetic tape head that provides a closure joined to a substrate where a writing element is formed, and relates to a magnetic tape drive device where the thin film magnetic tape head is provided.

BACKGROUND

Multi-channel type magnetic tape drive devices are devices for writing magnetic information on magnetic tape and reading written magnetic information. The multi-channel type magnetic tape drive devices provide a thin film magnetic tape head that has a reading element and writing element for a plurality of channels (see U.S. Pat. No. 6,885,518 B1).

For example, the fourth generation magnetic tape head according to the linear tape open (LTO) standard has a 16-channel reading element, a 16-channel writing element, and a 2-channel servo element.

The writing element has a coil part for generating a magnetic flux, and a yoke part for guiding the magnetic flux from the coil part to the outside. The yoke part is preferably composed of a soft magnetic material. The writing element writes the magnetic information on a magnetic tape as a recording medium by way of this magnetic flux.

The magnetic tape head has a substrate where the writing element and the reading element are formed and a closure that is joined to the substrate. When foreign matter is sandwiched between the substrate and the closure, stress is generated inside the substrate due to the external force from the foreign matter. Particularly, when this stress is strongly applied to the yoke part of the writing element, inductance of the yoke part decreases. As illustrated in FIG. 1, in a magnetic tape head where inductance of the yoke part is decreased, the increase of the reproducing output in relation to the write current (or recording current) is slower as compared to a normal magnetic tape head that has no decrease in inductance, and the reproducing output may decrease.

Accordingly, there is desire for a magnetic tape head to be provided that can suppress the decrease in performance caused by the foreign matter sandwiched between the substrate and closure.

SUMMARY

The object of the present invention is to provide a magnetic recording head that controls a decrease of its performance due to foreign matter.

A magnetic tape head includes a writing element having a coil for generating magnetic flux and a yoke part that emits magnetic flux induced by the coil from a tape bearing surface opposite a magnetic tape, a substrate where the writing element is formed; and a closure joined with the substrate. A gap formed at a portion between the substrate and the closure exists from the yoke part in a direction orthogonal to a junction surface between the substrate and the closure.

Another embodiment of the magnetic tape drive device includes the magnetic tape head discussed above, and a drive device for relatively moving the magnetic tape head and magnetic tape opposite to the magnetic tape head.

According to the present magnetic tape head, even if foreign matter exists between the substrate and the closure, stress applied to at least the yoke part is reduced because there is the gap from the yoke part in a direction orthogonal to the joined surfaces of the substrate and the closure. Therefore, the decrease in inductance of the yoke part is suppressed by reducing the stress generated in the yoke part that composes a magnetic circuit.

The above description, as well as other objects, features, and advantages of the present invention will be evident from the following description with reference to attached drawings illustrating the present invention.

DETAILED DESCRIPTION OF THE INVENTION

A description will be given hereinafter of a thin film magnetic tape head that relates to one embodiment of the present invention with reference to drawings.

In the following embodiments, a thin film magnetic tape head that is used in a multi-channel type magnetic tape drive device is described in detail as an example; however, the present invention can be applied to all magnetic tape heads that provide a closure joined to a substrate where a writing element is formed.

Figure 1:
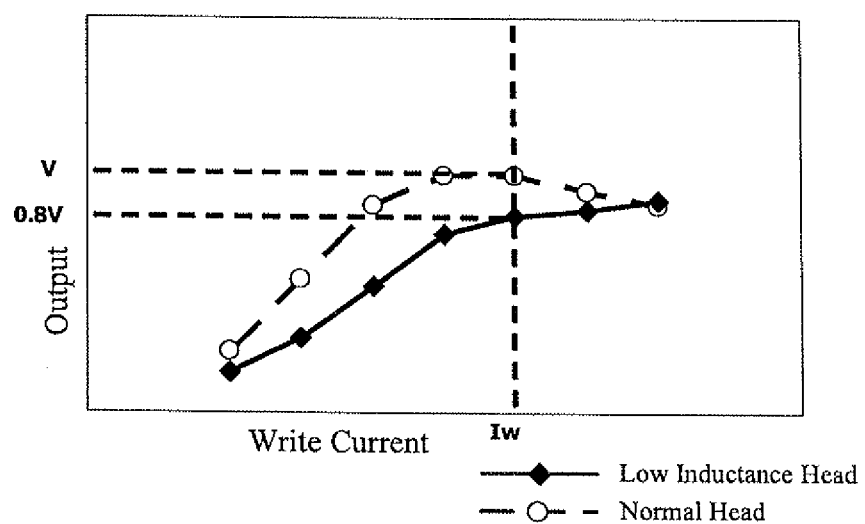
FIG. 1 is a graph for describing the decrease in a reproducing output caused by the decrease in inductance of a yoke part.
Figure 2:
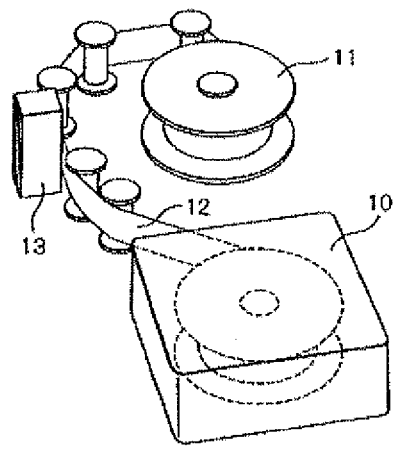
FIG. 2 is a schematic diagram illustrating a structure of a magnetic tape drive device that relates to one embodiment of the present invention.
Figure 3:
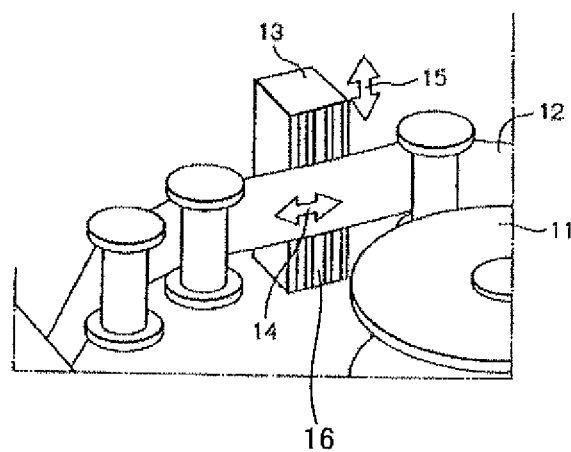
FIG. 3 is a schematic diagram where the vicinity of a magnetic tape head of the magnetic tape drive device in FIG. 2 is enlarged.

FIG. 2 schematically illustrates a structure of the magnetic tape drive device that relates to one embodiment of the present invention. FIG. 3 is a schematic diagram where the vicinity of the magnetic tape head of the magnetic tape drive device is enlarged. The magnetic tape drive device provides a tape cartridge 10, a take-up reel 11, and a magnetic tape head 13.

The tape cartridge 10 stores a magnetic tape 12 as a recording medium where magnetic information is recorded. The take-up reel 11 temporarily winds the magnetic tape 12 that is drawn from the tape cartridge 10. The magnetic tape 12 is pulled tautly between the tape cartridge 10 and the take-up reel 11. The magnetic tape head 13 is arranged opposite to the magnetic tape 12. A surface of the magnetic tape head 13 opposite to the magnetic tape 12 is referred to as a tape bearing surface 16.

The tape cartridge 10 and/or take-up reel 11 is a drive device that moves the magnetic tape 12 in both directions 14 in relation to the magnetic tape head 13. The magnetic tape 12 has a plurality of recording tracks extending along the travel directions 14 of the magnetic tape 12. Further, the magnetic tape drive device may provide a drive device (not shown) to cause the magnetic tape head 13 to reciprocate in a direction (track width direction) 15 orthogonal to the travel directions 14 of the magnetic tape 12.

Figure 4:
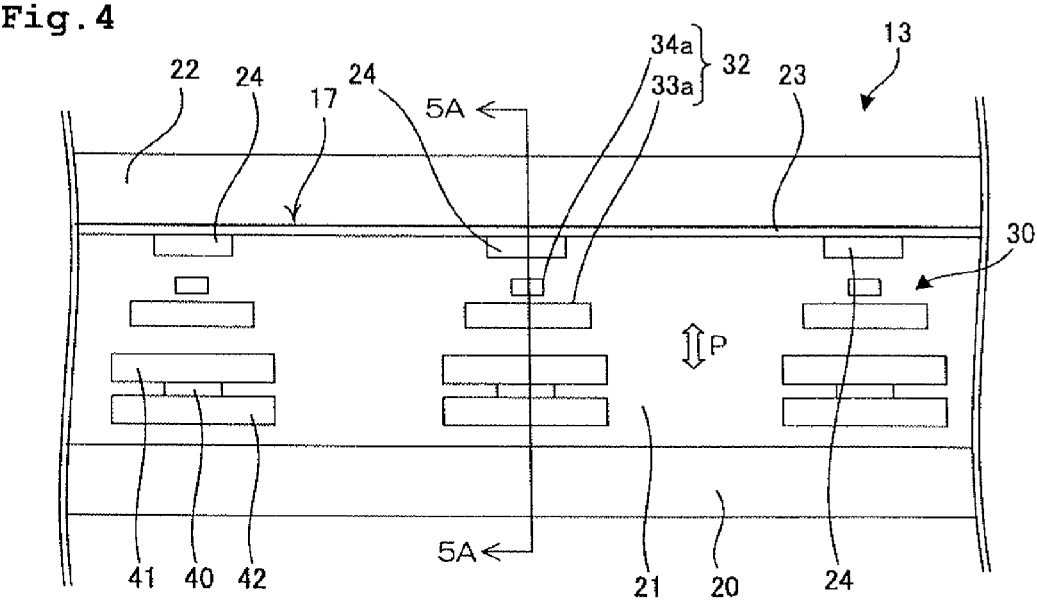
FIG. 4 is a schematic plan view of the magnetic tape head, viewed from a tape bearing surface.

The magnetic tape head 13 of the present embodiment provides a plurality of writing elements 30 and a plurality of reading elements 40 (see also FIG. 4). Alternatively, the magnetic tape head 13 may have just one reading element. The magnetic tape head 13 preferably provides an element for a servo (not shown).

When recording as well as reproducing on the magnetic tape 12, the magnetic tape 12 moves in the directions 14 of the arrow illustrated in FIG. 3. The writing element 30 of the magnetic tape head 13 records magnetic information on the magnetic tape 12, and the reading element 40 reads magnetic information from the magnetic tape 12 while in a state of contact with the magnetic tape 12 on the tape bearing surface 16.

Figure 5:
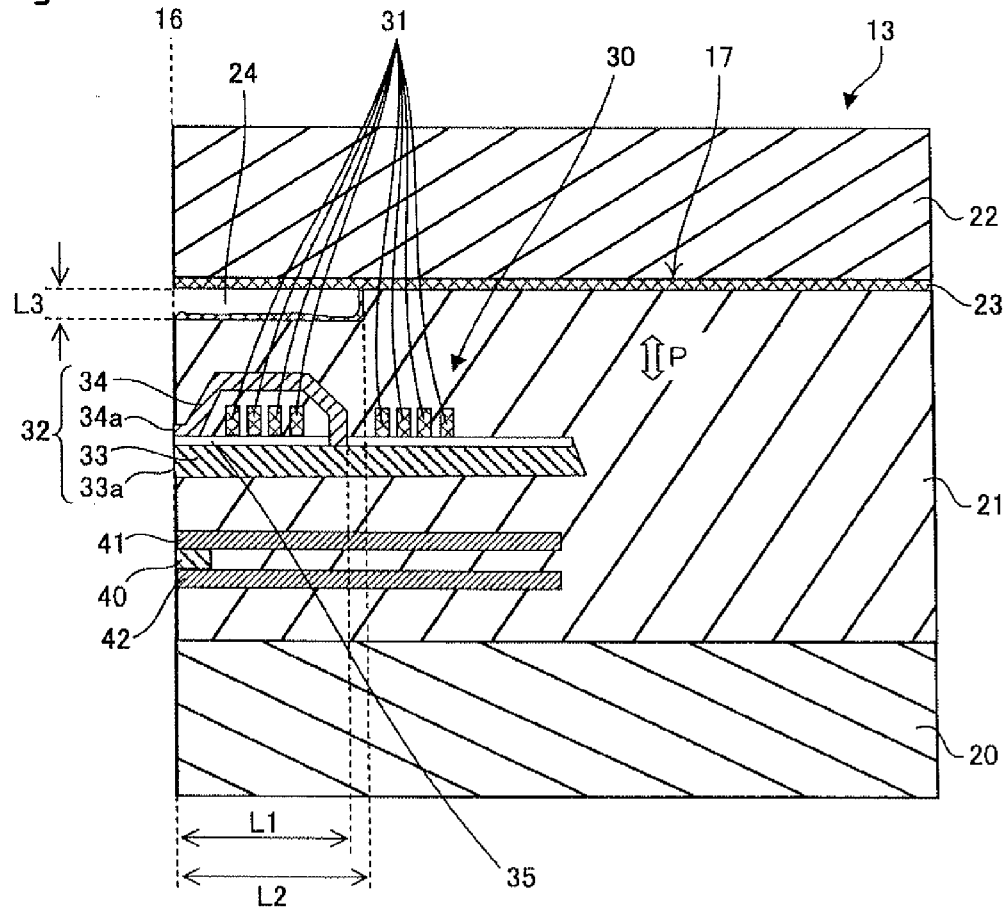
FIG. 5 is a schematic cross sectional view of the magnetic tape head along line 5A-5A in FIG. 4.

FIG. 4 is a schematic plan view of the magnetic tape head 13 viewed from the tape bearing surface 16. FIG. 5 is a schematic cross sectional view of the magnetic tape head 13 along line 5A-5A in FIG. 4. The magnetic tape head 13 provides a substrate 21, where the writing element 30 and reading element 40 are formed, and a closure 22 joined to the substrate 21. Specifically, the closure 22 is adjacent to the substrate 21 in the track direction of the magnetic tape 12 that is opposite to the magnetic tape head 13, or in other words, in the travel directions 14 of the magnetic tape 12. The substrate 21 is formed on a base 20.

The substrate 21 is preferably made of a non-magnetic insulator such as $Al_2O_3$, $SiO_2$, AlN, or a diamond-like carbon (DLC). The substrate is formed by a sputtering method, chemical vapor deposition (CVD) method, or the like. The substrate 21 covers the writing element 30 and the reading element 40, and protects the writing element 30 and the reading element 40.

The closure 22 is preferably made of a non-magnetic material such as, for example, AlTiC. Junction surfaces 17 of the substrate 21 and the closure 22 are joined together by an adhesive material 23. An arbitrary material can be used for the adhesive material 23. For example, a synthetic resin such as epoxy resin or polyimide resin can be used.

The reading element 40 may be an arbitrary element as long as magnetic information of the magnetic tape 12 can be read. An example of the reading element 40 is a magnetoresistive effect (MR) element. A surface of the MR element is positioned on the tape bearing surface 16. Shield layers 41 and 42 are provided at both sides of the MR element. The shield layers 41 and 42 have a function to prevent an external magnetic field from an adjacent bit on the same track as the magnetic tape 12 from acting on the MR element. The electrical resistance value of the MR element changes according to the external magnetic field, or in other words, the magnetic field from the magnetic tape 12. The MR element can detect the external magnetic field and specify the magnetic information recorded on the magnetic tape 12 according to the changes in the electrical resistance value.

The writing element 30 has a yoke part 32 and a coil part 31 that generates magnetic flux. The yoke part 32 emits the magnetic flux, induced by the coil part 31, from the tape bearing surface 16.

Specifically, the yoke part 32 has a first magnetic pole layer 33 and a second magnetic pole layer 34. The first magnetic pole layer 33 extends from a first surface 33a positioned on the tape bearing surface 16 toward the inner part of the substrate 21. The second magnetic pole layer 34 extends from a second surface 34a that is positioned on the tape bearing surface 16 and is closer to the junction surface 17 than the first surface 33a, toward the inner part of the substrate 21. The first magnetic pole layer 33 and the second magnetic pole layer 34 contact at the inner part of the substrate 21 so that the yoke part 32 passes through the coil part 31.

The first magnetic pole layer 33 and second magnetic pole layer 34 are preferably made of a soft magnetic material such as, for example, NiFe, CoFeNi, CoFe, FeN, FeZrN, CoZrTaCr, or the like, or a multilayer film composed of those materials. The thickness of the first magnetic pole layer 33 and second magnetic pole layer 34 is preferably between approximately 0.5 and 5.0 μm. The first magnetic pole layer 33 and second magnetic pole layer 34 are formed by a frame plating method, sputtering method, or the like.

On the tape bearing surface 16, the first surface 33a of the first magnetic pole layer 33 and the second surface 34a of the second magnetic pole layer 34 are separated by an insulation layer 35. The first surface 33a and the second surface 34a are mutually different magnetic poles. Therefore, magnetic flux emitted from the yoke part 32 flows between the first surface 33a of the first magnetic pole layer 33 and the second surface 34a of the second magnetic pole layer 34.

A gap 24 is formed between a portion of the substrate 21 and the closure 22. The gap 24 exists from the yoke part 32 in the direction P orthogonal to the junction surface 17 of the substrate 21 and the closure 22. Accordingly, even if foreign matter exists between the substrate 21 and the closure 22, the foreign matter either enters into the gap 24 above the yoke part 32, or exists on the junction surface 17 positioned away from the gap 24. Therefore, the stress applied to the yoke part 32, and especially to the second magnetic pole layer 34, caused by the pressure (external force) from the foreign matter, is reduced. Accordingly, the decrease in the inductance of the yoke part 32 and/or the delay of light saturation having dynamic characteristics or the like are suppressed, and thus the decrease in performance of the writing element 30 due to the foreign matter can be prevented.

In addition, in the magnetic tape head described in U.S. Pat. No. 6,885,518 B1, a C-core for stopping the flow of adhesive material is formed on the closure in order to enhance the adhesion between the substrate and the closure. However, the effect of stress due to foreign matter is not considered, and the position of the C-core is not specified.

In the magnetic tape head of the present embodiment, if the yoke part 32 has surfaces 33a and 34a positioned on the tape bearing surface 16, the gap 24 faces the tape bearing surface 16. The length L2 of the gap 24 in a direction orthogonal to the tape bearing surface 16 is preferably longer than the length L1 of the second magnetic pole layer 34 in a direction orthogonal to the tape bearing surface 16, in order to suppress stress on the yoke part 32 as much as possible, especially on the second magnetic pole layer 34. Further, for the same reason, the size of the gap 24 is preferably larger than the size of the second magnetic pole layer 34 in the plane parallel to the junction surface 17.

Figure 6:
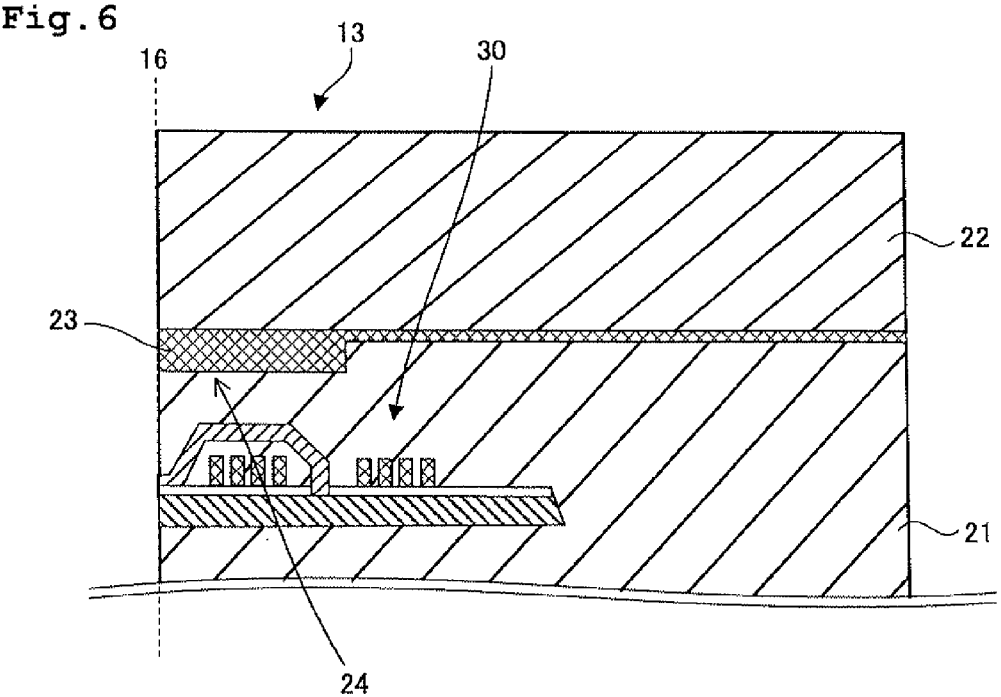
FIG. 6 is a schematic cross sectional view illustrating a structure of a magnetic tape head that relates to another embodiment.

The adhesive material 23 for joining the substrate 21 and the closure 22 may be present in at least a portion of the gap 24. In particular, when using an adhesive material 23 that is melted at the time of joining, the adhesive material 23 partially or entirely enters into the gap 24 at the time of joining FIG. 6 illustrates a magnetic tape head where the adhesive material 23 is filled into the entire gap 24 between the substrate 21 and the closure 22. Even in this case, the stress applied to the yoke part 32 due to foreign matter is reduced by the use of the adhesive material 23 that melts at the time of joining.

The length L3 of the gap 24 in the directions P orthogonal to the junction surface 17 is preferably 1 μm or greater. This is in consideration of the size of foreign matter that easily remains on the junction surface 17. Comparatively large foreign matter can also be removed to a certain extent by cleaning the junction surface of the substrate 21 and the closure 22 before joining.

In an example illustrated in FIG. 4 and FIG. 5, the gap 24 is configured by a concave part formed on a flat surface of the substrate 21. Alternatively, the gap may be configured by a concave part formed on a flat surface of the closure. Furthermore, the gap may be configured by mutually aligning the concave part formed on a flat surface of the substrate and the concave part formed on a flat surface of the closure. Such concave parts are formed by, for example, etching the surface of the substrate 21 and/or closure 22.

In addition, although not shown, a thin passivation film may be formed on the tape bearing surface 16 of the magnetic tape head 13 in order to prevent deterioration of the magnetic tape head 13 due to contact with the magnetic tape 12.

The following is a manufacturing example of the magnetic tape head 13 described above. Initially, the reading element 40 and the writing element 30 are formed on a wafer to be the substrate 21, using a sputtering method, CVD method, frame plating method or the like. Accordingly, the wafer where the magnetic tape head 13 is formed is provided.

Figure 7:
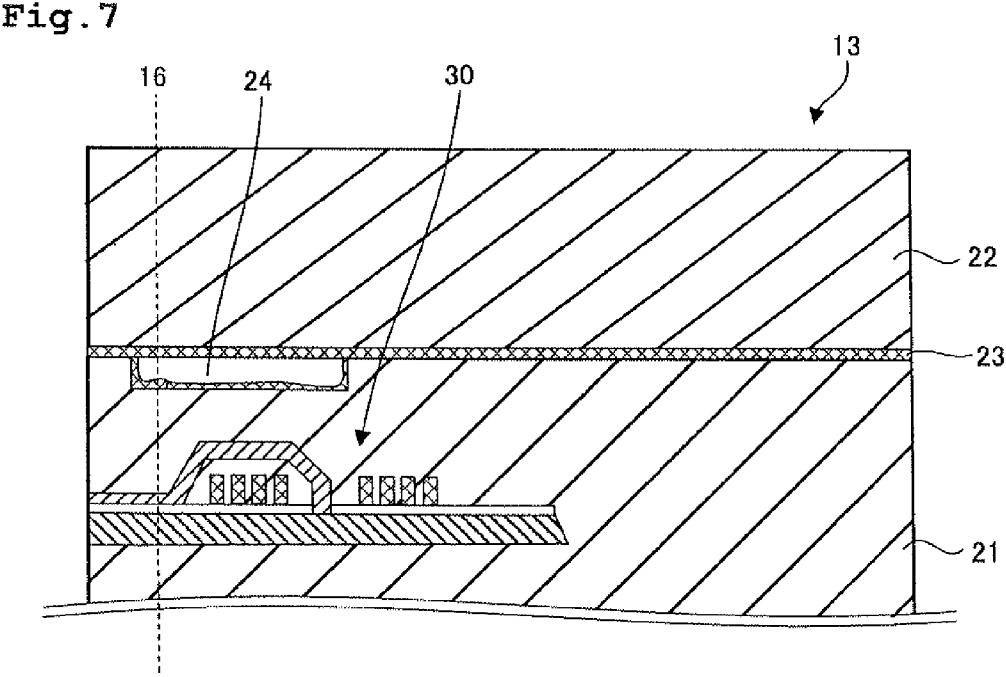
FIG. 7 is a schematic cross sectional view illustrating the structure of the magnetic tape head prior to polishing the tape bearing surface.

Subsequently, a concave part is formed by etching on a surface of the wafer to be the substrate 21 and/or the wafer to be the closure 22. After both wafers are mutually joined, each individual magnetic tape head 13 is cut out (see FIG. 7). Next, a surface of the magnetic tape head 13 is polished to expose the tape bearing surface 16. In this manner, the magnetic tape head 13 described above is manufactured.

Figure 8:
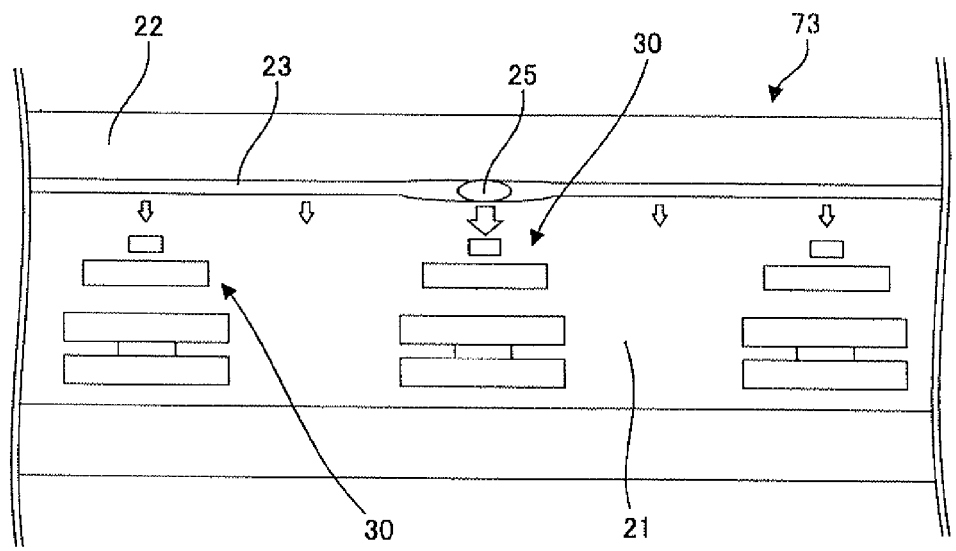
FIG. 8 is a schematic plan view of the magnetic tape head of a comparative example, viewed from the tape bearing surface.

A description is given hereinafter regarding the decrease in inductance of the yoke part 32 due to foreign matter. As illustrated in FIG. 8, a magnetic tape head 73 where the substrate 21 and the closure 22 were joined by adhesive material 23 without a gap between the substrate 21 and the closure 22 was prepared as a comparative example. The magnetic tape head 73 of the comparative example had sixteen writing elements 30. Herein, gold was inserted as the foreign matter 25 in a region between the substrate 21 and the closure 22 that was directly above one of the writing elements. Strong stress (see arrow in FIG. 8) was applied to one writing element 30, particularly to the second magnetic pole layer of the yoke part, by the foreign matter 25.

Figure 9:
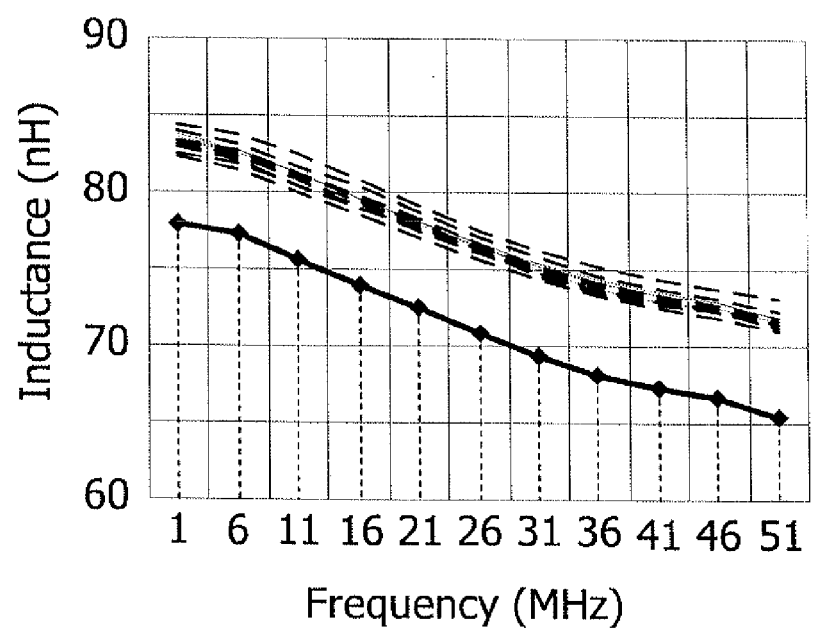
FIG. 9 is a graph showing a frequency dependency of the inductance measured by a writing element of the magnetic tape head illustrated in FIG. 8.

FIG. 9 shows results in which the frequency characteristics of the inductance were measured in the magnetic tape head 73 of the comparative example. In the graph, the solid line indicates the results for one writing element where strong stress was applied by foreign matter 25, and the broken lines indicate the results for other writing elements. When referring to the graph, the inductance of the writing element 30, where a strong force was applied from the foreign matter 25, obviously decreased when compared to other writing elements. In the magnetic tape head of the present embodiment, such a decrease in the inductance can be prevented because the foreign matter 25 is held in the gap between the substrate and the closure (see FIG. 10 also).

Figure 10:
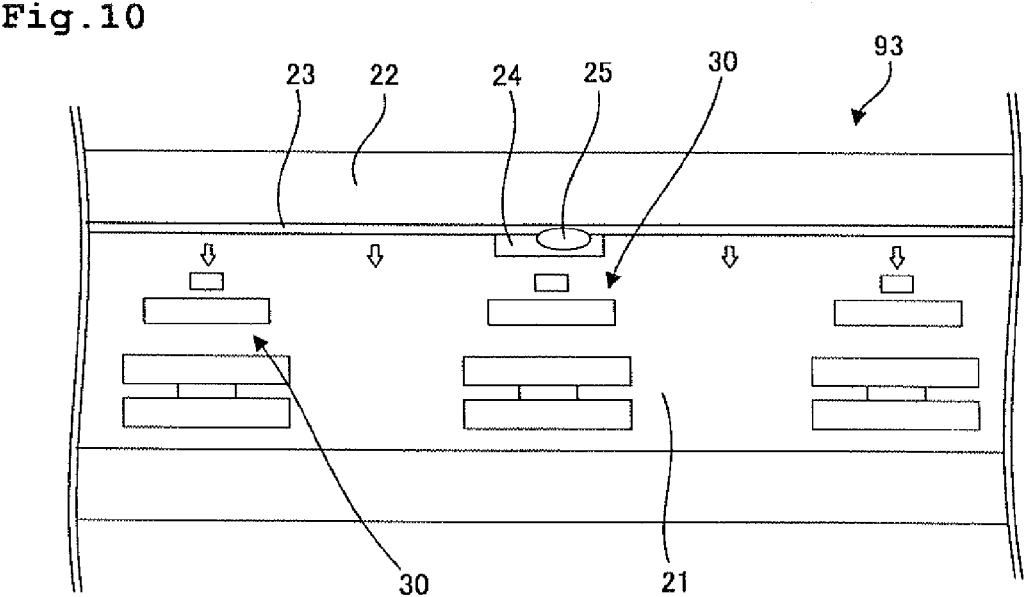
FIG. 10 is a schematic plan view of the magnetic tape head of one embodiment of the present invention, viewed from the tape bearing surface.

Next, a description is given regarding results of a similar measurement by using the magnetic tape head 93 of one embodiment of the present invention as shown in FIG. 10. The magnetic tape head 93 used here had sixteen writing elements 30. For comparison, one gap 24 was provided between the substrate 21 and the closure 22 corresponding to only one writing element 30 from among the sixteen writing elements 30.

Figure 11:
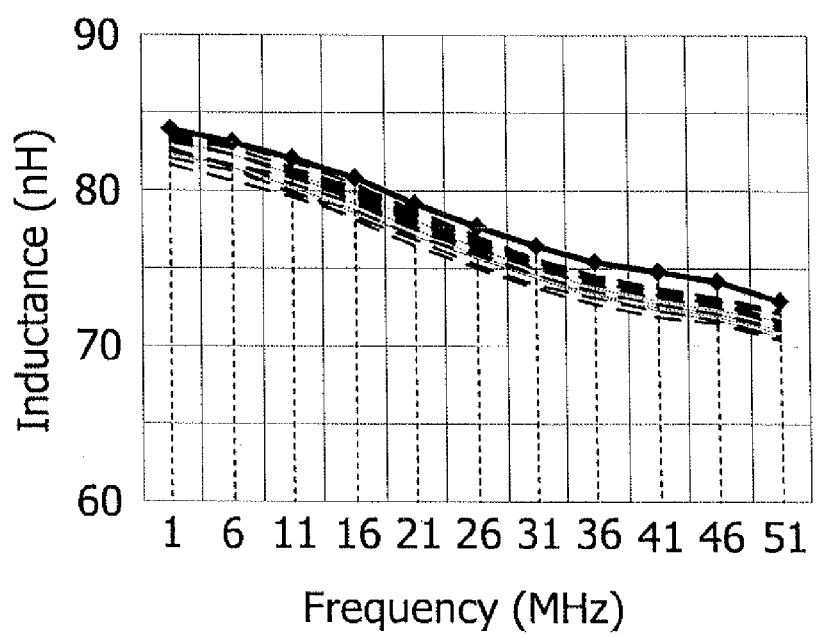
FIG. 11 is a graph showing the frequency dependency of the inductance measured by the writing element of the magnetic tape head illustrated in FIG. 10.

FIG. 11 shows results of the measurement of the frequency characteristics of inductance in the magnetic tape head 93 of the present embodiment. In the graph, the solid line indicates the result for the one writing element that corresponds to a region where the gap 24 was formed, and the broken lines indicate the results for other writing elements. When referring to the graph, the inductance of the one writing element that corresponds to the region where the gap 24 was formed is approximately the same level as the inductance of other writing elements.

When examined in greater detail, the inductance of the one writing element that corresponds to the region where the gap 24 was formed appears to be slightly larger than the inductance of other writing elements. This may be considered because force from the closure 22 was not applied to a portion where the gap 24 existed and then a slight decrease in the stress applied to the yoke part of the writing element 30 occurred.

In the embodiment described above, reference was given only to one writing element in the magnetic tape head 93; however, a plurality of gaps are preferred to be formed corresponding to each yoke part that configures a plurality of writing elements. Accordingly, the decrease in inductance due to foreign matter can be prevented in all of the writing elements 30.

A detailed description has been given by presenting a preferred embodiment of the present invention; however, it should be understood that various modifications and revisions are possible without departing from the essence and scope of the attached patent claims.

What is claimed is:

1. A magnetic tape head, comprising:
   a writing element having a coil for generating magnetic flux and a yoke part that emits magnetic flux induced by the coil from a tape bearing surface opposite a magnetic tape;
   a substrate on which the writing element is formed; and
   a closure joined with the substrate, wherein
   a gap formed at a portion between the substrate and the closure exists from the yoke part in a direction orthogonal to a junction surface between the substrate and the closure;
   the substrate and the closure are mutually joined by an adhesive material; and
   the adhesive material is provided in at least a portion of the gap.

2. The magnetic tape head according to claim 1, wherein the gap faces the tape bearing surface.

3. The magnetic tape head according to claim 2, wherein
   the yoke part has a first magnetic pole layer extending from a first surface that is positioned on the tape bearing surface to an inner part of the substrate, and a second magnetic pole layer positioned on the tape bearing surface and extending from a second surface that is closer to the junction surface than the first surface to the inner part of the substrate;

the first magnetic pole layer and the second magnetic pole layer contact at the inner part of the substrate so that the yoke part passes through the coil; and a length of the gap in a direction orthogonal to the tape bearing surface is longer than a length of the second magnetic pole layer in a direction orthogonal to the tape bearing surface.

4. The magnetic tape head according to claim 2, wherein the yoke part has a first magnetic pole layer extended from a first surface that is positioned on the tape bearing surface to an inner part of the substrate, and a second magnetic pole layer positioned on the tape bearing surface and extending from a second surface that is closer to the junction surface than the first surface to the inner part of the substrate;

the first magnetic pole layer and the second magnetic pole layer contact at the inner part of the substrate so that the yoke part passes through the coil; and a size of the gap is larger than a size of the second magnetic pole layer in a plane parallel to the junction surface.

5. The magnetic tape head according to claim 1, wherein a plurality of the writing elements are formed in the substrate;

the gap comprises a plurality of gaps; and the plurality of corresponding to the yoke parts that respectively configure the writing elements are formed between the substrate and the closure.

6. The magnetic tape head according to claim 1, wherein the length of the gap in the direction orthogonal to the junction surface is 1 μm or greater.

7. The magnetic tape head according to claim 1, wherein the gap is configured by a concave part formed on a flat surface of the substrate.

8. The magnetic tape head according to claim 1, wherein the gap is configured by a concave part formed on a flat surface of the closure.

9. The magnetic tape head according to claim 1, wherein the gap is configured by aligning a concave part formed on a flat surface of the substrate and a concave part formed on a flat surface of the closure.

10. The magnetic tape head according to claim 1, further comprising a reading element for reading magnetic information of the magnetic tape.

11. A magnetic tape drive device, comprising:

magnetic tape head according to claim 1; and a drive device for relatively moving the magnetic tape head and magnetic tape opposite the magnetic tape head.

12. A magnetic tape head, comprising:

a writing element having a coil for generating magnetic flux and a yoke part that emits magnetic flux induced by the coil from a tape bearing surface opposite a magnetic tape;

a substrate on which the writing element is formed; and a closure joined with the substrate, wherein a plurality of gaps formed at a portion between the substrate and the closure exists from the yoke part in a direction orthogonal to a junction surface between the substrate and the closure;

a plurality of the writing elements are formed in the substrate; and the plurality of gaps corresponding to the yoke parts that respectively configure the writing elements are formed between the substrate and the closure.

13. A magnetic tape head, comprising:

a writing element having a coil for generating magnetic flux and a yoke part that emits magnetic flux induced by the coil from a tape bearing surface opposite a magnetic tape;

a substrate on which the writing element is formed; and a closure joined with the substrate, wherein a gap formed at a portion between the substrate and the closure exists from the yoke part in a direction orthogonal to a junction surface between the substrate and the closure; and the gap is configured by aligning a concave part formed on a flat surface of the substrate and a concave part formed on a flat surface of the closure.

* * * * *